(12) United States Patent
Baker

(10) Patent No.: US 9,565,798 B2
(45) Date of Patent: Feb. 14, 2017

(54) WIRELESS FLOW MONITORING SYSTEM FOR AN AIR SEEDER

(71) Applicant: William J. Baker, Saskatoon (CA)

(72) Inventor: William J. Baker, Saskatoon (CA)

(73) Assignee: William Baker, Saskatoon, Saskatchewan (CA)

( * ) Notice: Subject to any disclaimer, the term of this patent is extended or adjusted under 35 U.S.C. 154(b) by 0 days.

(21) Appl. No.: 14/897,133

(22) PCT Filed: Jun. 12, 2014

(86) PCT No.: PCT/CA2014/000494
§ 371 (c)(1),
(2) Date: Dec. 9, 2015

(87) PCT Pub. No.: WO2014/197973
PCT Pub. Date: Dec. 18, 2014

(65) Prior Publication Data
US 2016/0143211 A1    May 26, 2016

Related U.S. Application Data

(60) Provisional application No. 61/834,552, filed on Jun. 13, 2013.

(51) Int. Cl.
*G01F 1/30* (2006.01)
*A01C 7/10* (2006.01)
(Continued)

(52) U.S. Cl.
CPC ............. *A01C 7/105* (2013.01); *A01C 7/082* (2013.01); *G01F 1/661* (2013.01); *G01F 1/662* (2013.01); *A01C 7/081* (2013.01); *Y02P 60/16* (2015.11)

(58) Field of Classification Search
USPC .................................. 73/861.73; 111/903; 1/1
See application file for complete search history.

(56) References Cited

U.S. PATENT DOCUMENTS 4,149,163 A * 4/1979 Fathauer ............... A01C 7/105
                                                    111/903
5,831,542 A   11/1998 Thomas et al.
(Continued)

FOREIGN PATENT DOCUMENTS

RU            112807 U1    1/2012

OTHER PUBLICATIONS

International Search Report and Written Opinion dated Sep. 16, 2014 for Application No. PCT/CA2014/000494, 7 pgs.
(Continued)

*Primary Examiner* — Jewel V Thompson
(74) *Attorney, Agent, or Firm* — Frost Brown Todd LLC

(57) ABSTRACT

An agricultural product flow sensor and a flow sensor system for delivery tubes in an air seeder is provided. The flow sensor can include a particulate material sensor for sensing agricultural product passing through a delivery tub, a radio node for transmitting and receiving wireless signals and a wireless power source. The sensor system can use the flow sensors by attaching the flow sensors inline with delivery tubes and near a working tool. The flow sensors can monitor the flow of agricultural product through the delivery tube and transmit flow information to a person operating the air seeder.

31 Claims, 5 Drawing Sheets

(51) Int. Cl.
*G01F 1/66* (2006.01)
*A01C 7/08* (2006.01)

(56) References Cited

U.S. PATENT DOCUMENTS

| 8,950,260 | B2 | 2/2015 | Gelinske et al. | |
| 2016/0246296 | A1* | 8/2016 | Gelinske | G05D 7/00 |
| 2016/0327467 | A1* | 11/2016 | Casasanta, III | G01N 21/53 |

OTHER PUBLICATIONS

International Preliminary Report on Patentability dated Dec. 15, 2015 for Application No. PCT/CA2014/000494, 5 pgs.

* cited by examiner

WIRELESS FLOW MONITORING SYSTEM FOR AN AIR SEEDER

This disclosure relates to the field of agricultural air seeders and in particular a blockage monitor for detecting blocked conduits in the pneumatic conveying systems of such air seeders.

BACKGROUND

In an air seeder, agricultural materials such as seed, fertilizer, and chemicals are dispensed from respective holding tanks into an air stream that carries the materials through a distribution network to an array of furrow openers mounted along the width of the implement frame which create furrows in the soil surface. In some types of air seeders, the distribution network includes larger tubes carrying product from the holding tanks to manifolds where the air stream and entrained agricultural products are divided and directed into smaller delivery tubes, and the output of the final delivery tube in the network dispenses the agricultural products into the furrows. In other types of air seeders, a single delivery tube may carry products directly from the product tanks to each furrow.

In large modern air seeders, there may be 100 or more furrow openers spread across the width of the implement and it is desirable to monitor the flow of agricultural products to the furrow openers to ensure that the system is working properly. Blockages due to low air flow, plugged furrow openers, empty product tanks, meter failure, or the like can result in stoppages in product flow. Also the rate of product flow may be less than desired for various reasons. To address this problem, monitors and sensors have been developed to monitor product flow in these distribution networks.

U.S. Pat. No. 5,831,542 to Thomas discloses an air seeder blockage monitoring system operative to detect seeds and like agricultural products flowing in a conduit and indicate to the operator that products are flowing, and also the rate of product flow.

Such monitors are commercially available from various sources. Intelligent Agricultural Solutions of Fargo, N. Dak. manufactures a wireless blockage monitor where sounds from a diaphragm in a bend of a seed tube are carried through a tube to a control unit on the air seeder which essentially "hears" the sounds in each tube, and then sends an indication of product flow in each tube through a wireless connection to a display on the tractor. Thus there are no electric wires to each sensor, but a hollow tube must be installed from each sensor to the control unit.

Agtron Enterprises of Saskatoon, Canada manufactures a blockage and flow monitor with a sensor that uses infra-red light to detect flow. The sensors are connected to each other by wires in a daisy chain arrangement, and to a receiver which then sends readings from each sensor through a wireless connection to a display on the tractor. Wires carry power to each sensor, and also carry the sensed information from one sensor to the next.

Agri Motive Products of Warren, Ind. and Micro-Trak Systems, Inc. of Eagle Lake Minn. also manufacture such blockage monitors for air seeders.

While it is known to monitor product flow in only some delivery tubes, it is commonly desired to monitor product flow to each furrow to avoid areas of unseeded ground. With the very large number of furrow openers on current air seeder implement, and given that often each furrow opener will create furrows for two separate products with two separate product delivery tubes thus going to each furrow opener, hard connections of tubes and/or wires to each sensor on each delivery tube can become complicated and cluttered.

Additionally, these sensors are usually installed near a manifold where each delivery tube starts rather than being installed near where the furrow opener ends to simply wiring. To install one or two sensors near each furrow would require a large amount of wire and make the wiring of the system very complicated. The major problem of having a wired sensor by the opener is that trash and rocks distributed by the operation can rip off any wires. Also shank trips over rocks can cause a lot of stress on any wires. However by installing the sensors on the delivery tubes near the manifold, if a blockage should occur near the end of the delivery tube, it will take some time for the blocked delivery tube to fill up with agricultural product back to the sensor so that the sensor senses the "blockage".

SUMMARY OF THE INVENTION

The present disclosure provides a flow monitoring system for delivery tubes in an air seeder that overcomes problems in the prior art.

In the present disclosure flow sensor assemblies are attached to selected delivery tubes, or if desired to each delivery tube, and each flow sensor assembly acts as a node in a wireless mesh network that allows eventual transmission of wireless signals to central receiving unit which transmits information received from the flow sensor assemblies to a display module in the tractor cab which indicates to the operator the flow conditions in each delivery tube.

Using the wireless mesh network significantly reduces the power requirements for each flow sensor assembly, as it is only necessary to transmit to a neighboring radio node, which will typically be less than three to four feet away. Another significant advantage is that at least some neighboring nodes will be in direct line of sight at all times. Sending radio signals directly from each flow sensor assembly to a central receiver will typically be problematic because of obstruction from the many obstructions present on the complex air seeder.

The central receiving unit will typically be powered by the tractor electrical supply, and can be mounted in line of sight with at least some of the radio nodes, and also in line of sight with the monitor in the tractor cab. For example, in an air seeder with a tow-between cart, the central control unit can be mounted on top of the cart in a position where line of sight to the tractor can be maintained.

The reduced power requirements of the wireless mesh network would make it possible and practical to use vibration powered electrical generators to provide a continuing and renewing power source for each flow sensor assembly without requiring wires to be run to each flow sensor assembly. Very small random vibration electrical generators which can generate 0.5 milliwatts of electrical power are known in the art, such as disclosed by researchers at the University of Michigan in the United States. With the reduced power requirements of the wireless mesh network, such random vibration electrical generators can readily provide the power required to operate the flow sensor, processing unit and radio node in each flow sensor assembly.

Additionally, because each flow sensor assembly does not need to be connected by wires, either to transmit data to the central receiving unit or to have power supplied to it, the flow sensor assemblies can be connected closer to the furrow openers, rather than in their conventional position near the manifold. This allows the flow sensor assemblies to monitor the flow through the supply tubes near the furrow opener closer to where a blockage will first be determined, potentially allowing an operator to be warned that a supply tube is blocked or not flowing, much earlier than if the flow sensor assemblies were installed in the conventional spot near the manifold.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
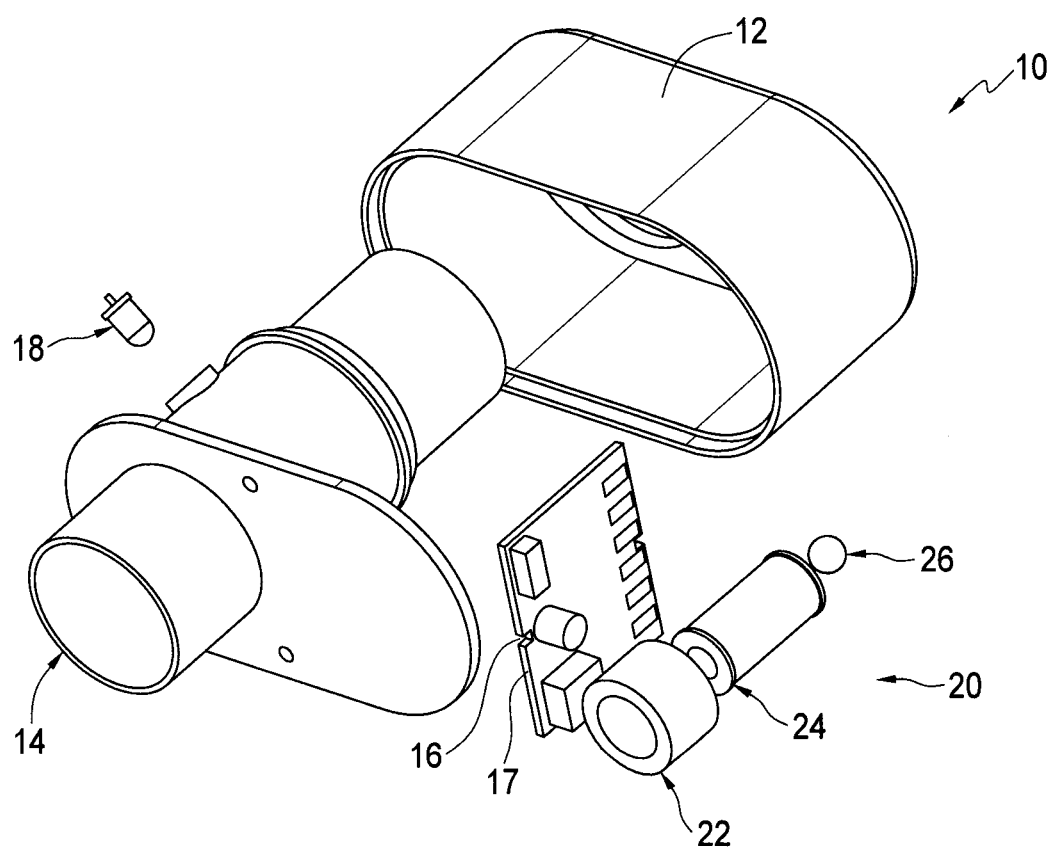
FIG. 1 is an exploded view of a flow sensor assembly.

FIG. 1 illustrates a flow sensor assembly 10 for use in sensing the passing of an agricultural product such as seed, fertilizer or other particulate material through a delivery tube on an air seeder (not shown). The flow sensor assembly 10 can include a housing 12, a passage 14, a processing unit 17, a radio node 16, a particulate material sensor 18 and a wireless power source 20.

Figure 2:
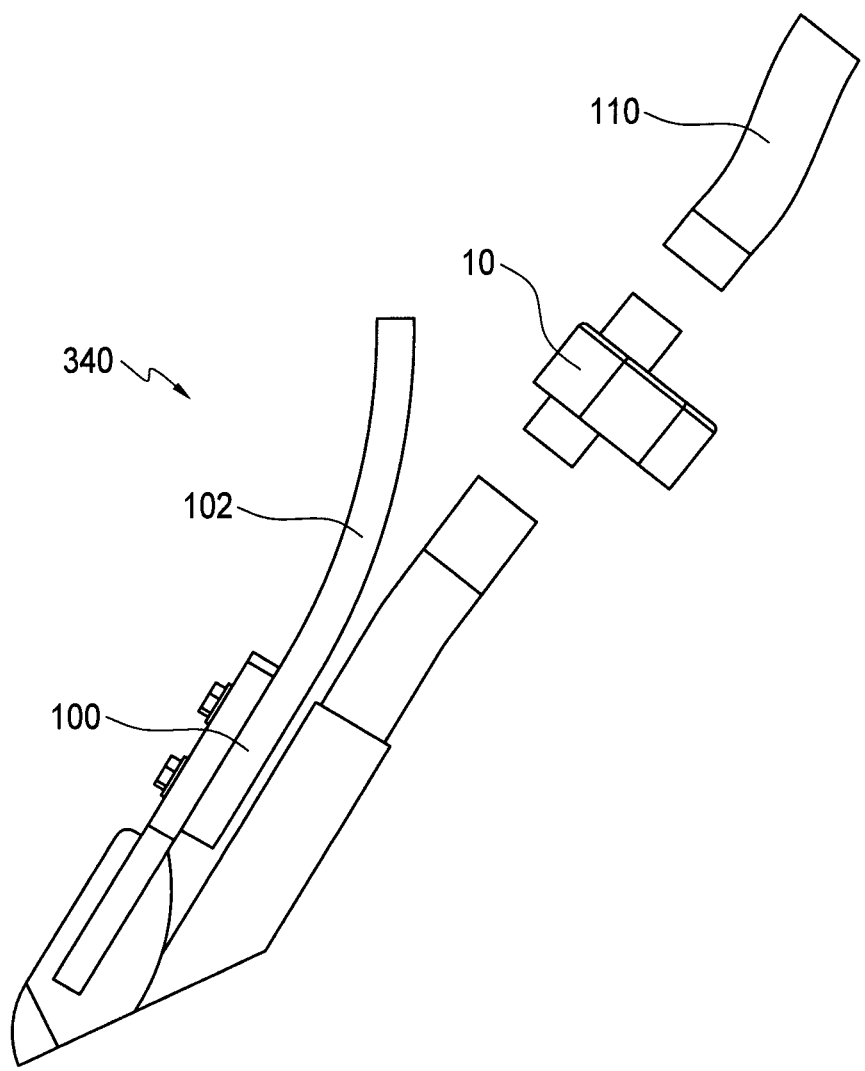
FIG. 2 is a schematic illustration of a flow sensor assembly installed on a seed assembly.

FIG. 2 illustrates a flow sensor assembly 10 installed inline with a delivery tube 110 that is directing seed or other particulate material to a furrow opener 100 of an air seeder so that the seed can be deposited in a furrow created by the furrow opener 100. The flow sensor assembly 10 is installed so that the delivery tube 110 connects with the passage on the flow sensor assembly 10 so that particulate material that passes through the delivery tube 110 will pass through the passage 14 in the flow sensor assembly 10 before it is directed into the furrow created by the furrow opener 100.

Particulate material passing through the passageway 14 of the flow sensor assembly 10 can be detected by the particulate material sensor 18. The particulate material sensor 18 can be an optical sensor (such as a visible or IR optical sensor), ultrasonic sensor, microwave sensor or any sensor capable of sensing the passage of particulate material passing through the passageway 14.

The processing unit 17 can perform a number of functions: it can receive and store data from the particulate material sensor 18; and it also controls a radio node 16 having a wireless signal receiver operative to receive wireless singles from neighboring flow sensor assemblies and a wireless signal transmitter operative to send wireless signals short distances.

The power supply 20 is used to power the radio node 16, the processing unit 17 and the particulate material sensor 18. The power supply 20 can be a battery in one aspect. In a further aspect, the power supply 20 can be a vibration powered electrical generator. A vibration powered electrical generator is a type of transducer that converts kinetic energy derived from ambient vibration to electrical energy. In one aspect, the power supply 20 could use piezoelectric materials to generate electrical energy. In another aspect, a magnet 22, coil 24 and steel ball 26 can be used to generate power electrical energy using the vibrations of the flow sensor assembly 10 to move the steel ball 26 relative to the coil 24 and magnet, thereby creating electrical energy to power the components of the flow sensor assembly 10.

A housing 12 can be provided to house and protect the various components of the flow sensor assembly 10.

Figure 3:
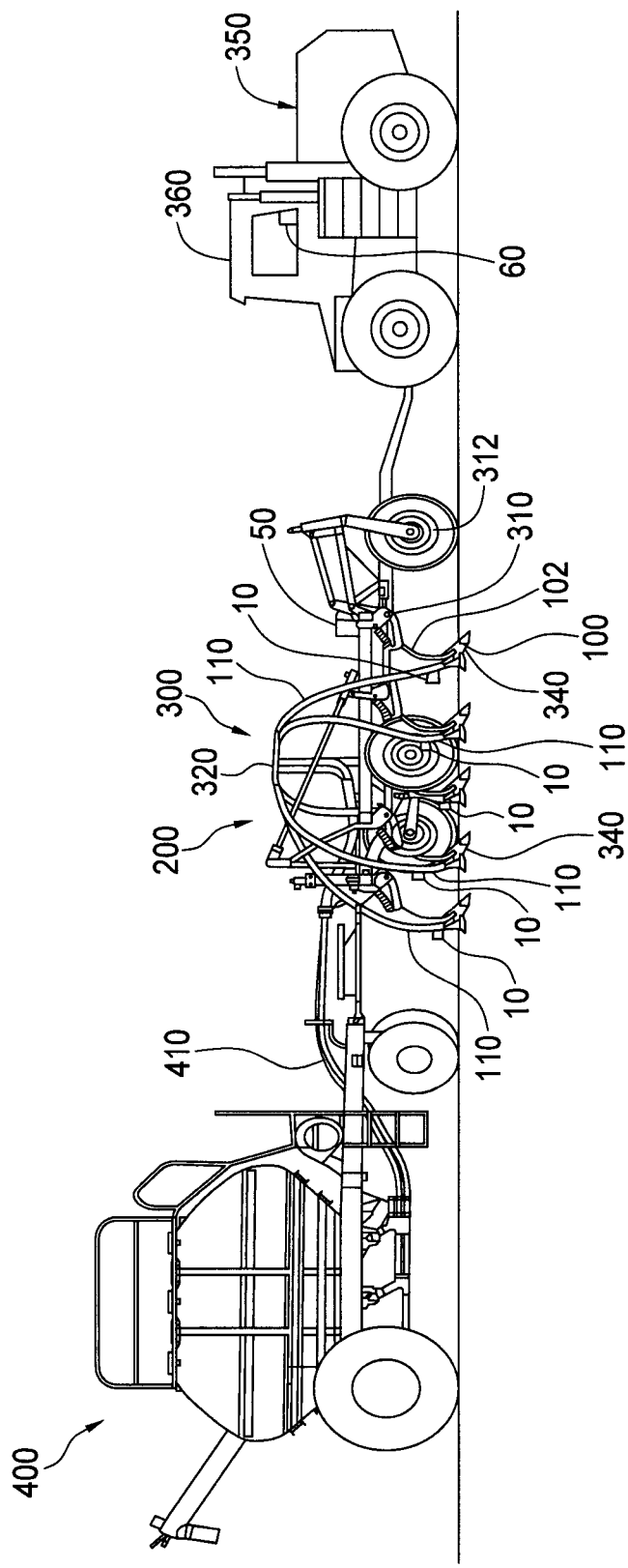
FIG. 3 is a schematic illustration of an air seeder using a flow sensor system.

FIG. 3 is a schematic illustration of a flow sensor system 200 installed on a typical air seeder apparatus 300. The air seeder 300 is used for seeding and/or fertilizing a field. A tow vehicle 350 is used to tow the air seeder 300. A product cart 400 is typically pulled behind the air seeder 300 and holds seed and/or fertilizer that is supplied to the air seeder 300 during its operation.

The air seeder 300 is used to inject particulate material (typically seed and/or fertilizer) supplied from the product cart 400 into the ground. The air seeder 300 typically contains a frame 310 supported by transport wheels 312. A number of ground working tools 340 in the form of furrow openers can be connected to the frame 310 and positioned so that they can create furrows in the ground. The particulate material will be directed into these open furrows by the air seeder 300. As can be better seen in FIG. 2, each ground working tool 340 can include an arm member 102 that supports a furrow opener 100, such as a knife element for forming the furrow in the ground.

The air seeder 300 can be hitched to a tow vehicle 350, such as an agricultural tractor, etc., so that the tow vehicle 350 can tow the air seeder 300 through a field to be seeded and/or fertilized. The product cart 400 can be hitched to the air seeder 300 so that the tow vehicle 350 tows both the air seeder 300 and the product cart 400. In another aspect, the product cart 400 may be hitched to the tow vehicle 350 and the air seeder 300 hitched to the product cart 400.

The product cart 400 can have one or more tanks that store seed and/or fertilizer that is supplied to the air seeder 300 to be placed in the ground. A pneumatic distribution system can be used to route particulate material from the product cart 400 to the air seeder 300 and into the furrows created by the ground working tools 340 with pressurized air forcing the particulate material through the pneumatic distribution system. Main supply lines 410 can route particulate material from the product tank 400 to the air seeder 300 where a distribution manifold 320 is provided to split up the particulate material passing through the main supply lines 410 into delivery tubes 110 running from the distribution manifold 320 to the ground working tools 340. The delivery tubes 110 will direct the particulate material into the furrows opened with the ground working tools 340.

Individual flow sensor assemblies 10 can be installed inline with the delivery tubes 110 on the ground working tools 340. In this manner, each delivery tube 110 supplying particulate material to a ground working tool 340 will have a flow sensor assembly 10 installed inline with it to sense whether particulate material is passing through the delivery tube 110. In one aspect, the flow sensor assembly 10 can count the number of pieces of particulate material passing through the delivery tube 110. In another aspect, the flow sensor assembly 10 could simply detect whether anything is moving past the particulate material sensor 18. If the flow sensor assembly 10 does not detect anything moving past it this could mean that either nothing is passing through the delivery tube 110 or that the delivery tube 110 is solidly blocked with particulate material.

Because each flow sensor assembly 10 can wirelessly transmit and receive signals and can be powered by its own wireless power supply 20 (in one aspect generating electrical energy from the vibration of the flow sensor assembly 10 while the air seeder 300 is in use), no wires have to be run along the air seeder 300 and to each of the flow sensor assemblies 10. Therefore, the flow sensor assemblies 10 can easily be installed at the ground working tools 340 to monitor the flow of particulate material through the delivery tube 110 close to where the particulate material will exit the delivery tube 110 and enter the furrow created by the ground working tool 340.

A central receiving unit 50 can be provided on the air seeder 300 for receiving signals from the various flow sensor assemblies 10 installed on the air seeder 300. The central receiving unit 50 can be in communication with a display module 60 in the cab 360 of the tow vehicle 350 pulling the air seeder 300 to transmit information that can be displayed to an operator on the display module 60. The central receiving unit 50 and the display module 350 can be in communication wirelessly, such as through the 802.11 IEE standard or even hardwired with cabling running between the display module 60 and the central receiving unit 50. The central receiving unit 50 can be hardwired to a power supply since the central receiving unit 50 can be installed in any number of positions on the air seeder 300 that can be convenient to run a power wire to.

Each flow sensor assembly 10 can monitor the flow of particulate material through the delivery tube 110 it is attached to in order to determine whether or not particulate material is flowing through the delivery tube 110. In this manner, if particulate material gets clogged or plugged in this delivery tube 110 and particulate material stops flowing through the delivery tube 110 and into the furrow being created by the ground engaging tool 340 that is associated with the delivery tube 110, this information can be transmitted by the flow sensor assembly 10 in a wireless flow signal to the central receiving unit 50 which will in turn transmit this information to the display module 60 where it will be displayed to the operator in the tow vehicle 350. The operator can then stop the tow vehicle 350 and the air seeder 300 and go determine whether the delivery tube 110 has been blocked or whether there is another reason for the particulate material to have stopped flowing and fix the problem before continuing seeding and/or fertilizing the field.

In one aspect, the flow sensor assemblies 10 can also count the number of times particulate material passes the sensor 10 in a set time frame to obtain a measurement of the rate of flow of particulate material through the delivery tube 110. Periodically, the flow sensor assembly 10 can transmit the information it has collected to the central receiving unit 50.

Figure 4:
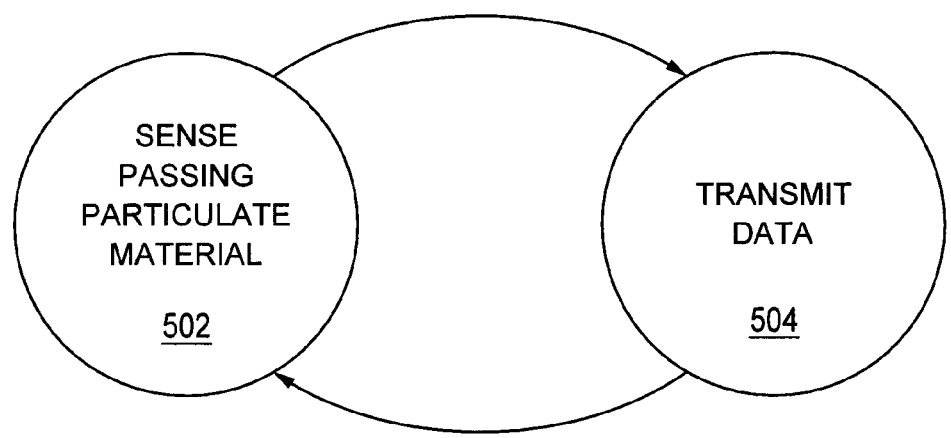
FIG. 4 is a state diagram illustrating two states of operation of the flow sensor assembly to limit the amount of power required by the flow sensor assembly.

Because each flow sensor assembly 10 contains its own power supply 20, and in one aspect the power supply 20 is a vibration-powered generator that generates electrical energy using the vibrations of the flow sensor assembly 10 and the air seeder 300 the flow sensor assembly 10 is installed on, the amount of power that the power supply 20 can supply may be limited. In one aspect, the flow sensor assembly 10 can operate in separate and discrete states to limit the amount of power the flow sensor assembly 10 requires at any one time from the power supply 20. FIG. 4 is a state diagram of two modes of operation of the flow sensor assembly 10 in one aspect. In a first state 502, the flow sensor assembly 10 can use the power supplied by the power supply 20 to use the particulate material sensor 18 to sense the passing of particulate material through the passageway 14 and store data related to whether or not particulate material is being sensed passing through the conduit. In one aspect, the flow sensor assembly 10 may also determine a rate of flow of particulate material passing through the flow sensor assembly 10 by counting the particulate material passing by the particulate material sensor 18 over a period of time. Periodically, the flow sensor assembly 10 can change to a second state 504 where it wirelessly transmits a signal containing the information it has collected and any other signals it has received from other neighboring flow assemblies 10. Once the data has been transmitted during state 504, the flow sensor assembly 10 can move back into the first state 502 and use the power supplied by the power supply 20 to operate the particulate material sensor 18 again.

In this manner, the flow sensor assembly 10 can operate in two discrete states to reduce the amount of power it requires, a first state 502 where the power supplied by the power supply is used to operate the particulate material sensor 18 and a second state 504 where the flow sensor assembly 10 transmits data wirelessly. In this manner, the flow sensor assembly 10 can operate using a very low power supply such as the power supplied by a vibration generated power supply.

In a further aspect, if the flow sensor assembly 10 is not being supplied with enough power from the power supply 20 to operate the particulate material sensor 18 and determine if particulate material is flowing through the delivery tube 110, but can still transmit wireless signals, the flow sensor assembly 10 can transmit a heartbeat signal simply indicating that the flow sensor assembly 10 is operating. When this signal is received by the central receiving unit 50, the central receiving unit 50 will know that the flow sensor assembly 10 is still operating and sending signals, but that it does not have enough power to fully operate and determine the condition of the flow or particulate material in the delivery tube 110 it is monitoring.

While the flow sensor assembly 10 is in either state, it can be receiving data packets from surrounding flow sensor assemblies 10 and storing these data packets to be transmitted out the next time the sensor 10 enters the second state 504.

Figure 5:
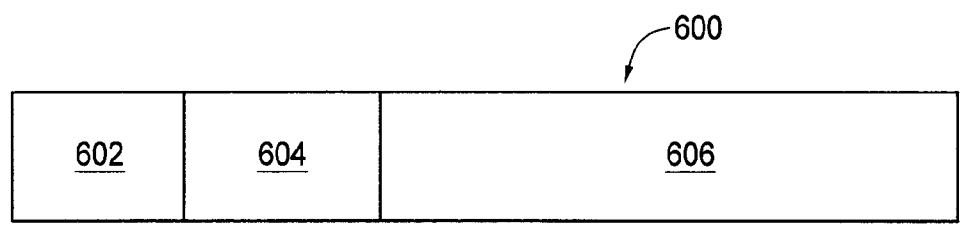
FIG. 5 is a schematic illustration of a data packet transmitted by the flow sensor assembly.

In one aspect, the sensor 10 can use the data gathered using the particulate material sensor 18 to create a data packet 600 as illustrated in FIG. 5 that contains information about the flow of particulate material in a delivery tube 110 that is being monitored by a flow sensor assembly 10. The data packet 600 will then be transmitted by the flow sensor assembly 10 as a wireless signal to other flow sensor assemblies 10 and ultimately to the central receiving unit 50. The data packet 600 can include a unique identifier 602 identifying the specific flow sensor assembly 10 that has collected the data and has transmitted the data packet 600; a flow indicator value 604, which could be a Boolean value that simply indicates whether or not the flow sensor assembly 10 identified in the unique identifier 602, has sensed the flow of particulate material passing through the delivery tube 110 the flow sensor assembly 10 is monitoring; and a flow rate field 606 storing an indicator of a rate of flow of the particulate material passing through the delivery tube 110 as measured by the flow sensor assembly 10. In one aspect, the rate of flow could be a value calculated by the flow sensor assembly 10 itself to determine a flow rate based on a count of particulate material past the particulate material sensor 18 over a period of time. In another aspect, the value stored could simply be a count of particulate material that has passed the particulate material sensor 18 over a period of time with the period of time being indicated or simply a predetermined time.

A person skilled in the art will appreciate that the data packet 600 could contain additional information, such as a unique identifier of a data packet, etc. as necessary to implement the flow sensor system 200.

Referring again to FIG. 3, in operation each of the flow sensor assemblies 10 in the flow sensor system 200 will collect data regarding the flow of particulate material through the delivery tube 110 that the flow sensor assembly 10 is monitoring and periodically transmit this information wirelessly where it will ultimately be received by the central receiving unit 50 to be transmitted to the display module 60 in the cab 360 of the tractor 350. In this manner, should any of the delivery tube 110 stop supplying seed or other particulate material to the ground engaging tool 340 so that the seed or other particulate material stops being dispensed into a furrow created by one of the ground engaging tool 340, the operator will be notified in tractor 350 and can stop the tractor 350 and air seeder 300 and deal with the particulate material stoppage.

However, rather than each flow sensor assembly 10 being able to wirelessly transmit information directly to the central receiving unit 50, the flow sensor system 200 can operate as a mesh network. Each flow sensor assembly 10 will not only wirelessly transmit information it has collected, but will also receive wirelessly transmitted information from nearby flow sensor assemblies 10 containing information these others flow sensor assemblies 10 have collected and then re-transmit these received signals. In this manner, a data packet transmitted in a wireless signal from a flow sensor assembly 10 connected to a ground engaging tool 340 relatively far from the central receiving unit 50 may be received and re-transmitted by a number of different flow sensor assemblies 10 in between the flow sensor assembly 10 that originally sent the data packet and the central receiving unit 50; with the data packet jumping from flow sensor assembly 10 to flow sensor assembly 10 until the data packet eventually reaches the central receiving unit 50 and is displayed on the display module 60 for the operator to see.

Having the flow sensor assemblies 10 communicate in a mesh network configuration allows less powerful transmitters to be used in each flow sensor assembly 10 that have a much smaller transmission range than if they were required to transmit directly to the central receiving unit 50. This can reduce the amount of power required by the transmitter and thereby allow a less powerful power source 20 to be used in each flow sensor assembly 10, including a power source 20 that produces electrical energy based on vibrations.

Air seeders are becoming increasingly wider, with air seeders now being commonly made that are between 40-50 feet wide. Some air seeders are even wider. This means that the flow sensor assemblies 10 mounted on the ground engaging tools 340 can be a significant distance from the center of the air seeder 300, where the central receiving unit 50 would typically be placed. For an air seeder that is 50 feet wide, the ground engaging tools 340 on each end could be 25 feet away from the central receiving unit 50. The ground engaging tools 340, however, are spaced relatively close to each other so the space between adjacent ground engaging tools 340 is much less than the distance from individual an individual flow sensor assembly 10 to the central receiving unit 50.

Providing a transmitter in the flow sensor assembly 10 that has a transmission range that is only the distance to the adjacent ground engaging tools 340 or somewhat further, but does not have a transmission range that is far enough to transmit all the way to the central receiving unit 50 (unless the flow sensor assemblies 10 are the ones positioned closest to the central receiving unit 50) or a transmission range that is half the width of the air seeder 300, can allow a less powerful transmitter to be used in the flow sensor assembly 10. This in turn can reduce the amount of power required by the flow sensor assembly 10 allowing the power supply 20 to produce less electrical energy than would be required if the transmitter was capable of directly transmitting to the central receiving unit 50 from any ground engaging tool 340 on the air seeder 300, while still allowing each flow sensor assembly 10 to communicate information to the central receiving node 50 by passing it from neighboring flow sensor assembly 10 to neighboring flow sensor assembly 10 until it reaches the central receiving unit 50. This reduced power supply requirement can enable the use of vibration based power generators, which may not be able to supply enough power, to power a more powerful transmitter.

As the flow sensor assemblies 10 collect data about particulate material passing through the delivery tubes 110 at the ground engaging tools 340 and periodically transmitting this information from flow sensor assembly 10 to flow sensor assembly 10 until it is all received by the central receiving node 50, the central receiving node 50 can transmit the collected information to the display module 60 to display it to the operator of the tow vehicle 350. At the central receiving unit 50, each data packet 600 received in a wireless signal from one of the flow sensor assemblies 10 can be analyzed. For each data packet 600, the central receiving unit 50 can determine which of the flow sensor assemblies 10 sent the data packet 600, such as by using the unique identifier 602 of the flow senor assembly 10 that was inserted in the data packet 600. The central receiving unit 50 can also use the information transmitted in the data packet 600 to determine if there is flow of particulate material passing through the delivery tube 100 that the flow sensor assembly 10 is monitoring. This can be done using the flow indicator value 604 contained in the data packet 600. If information is contained in the packet regarding a flow rate of the particulate material, the central receiving unit 50 can also use this information to determine a flow rate of the particle material passing through the delivery tube 110 being monitored by the sensor flow sensor assembly 10. With this information, the display module 60 can display to the operator of the tow vehicle 350 whether each of the different flow sensor assemblies 10 are sensing a flow of particulate material or not, indicating whether seed or fertilizer is being supplied to the furrow created by the ground engaging tool 340 the flow sensor assembly 10 is provided on. In this way, the operator can see if the air seeder 300 is placing seed and/or fertilizer in each of the furrows created by the air seeder 300 or whether or not it has stopped (i.e. blocked).

If flow rate information is included in the data packet 600, the central receiving unit 50 can transmit flow rate information to the display module 60 and the display module 60 can transmit the flow rates that have been measured by each flow sensor assembly 10 to be displayed on the display module 60 in addition to whether seed or fertilizer is flowing through each delivery tube 110 to the ground engaging tools 340.

In addition to analyzing the data contained in the data packet 600 transmitted by each of the flow sensor assemblies 10, the central receiving unit 50 can also determine how frequently each of the flow sensors assemblies 10 is communicating with the central receiving unit 50 and use this to provide an indicator of the transmission quality from each particular flow sensor assembly 10. This transmission quality indicator could be a value, color, etc. that indicates to the operator of the tow vehicle 350 how frequently the central receiving unit 50 is receiving wireless signals from a particular flow sensor assembly 10. Because each of the flow sensor assemblies 10 are communicating with the central receiving unit 50 in a mesh protocol, unlike a daisy chain, direct connection, wireless 802.11, or other network types, there is a danger that a data packet 600 from any of the flow sensor assemblies 10 may be lost. This can be for many reasons: the ad hoc nature of the network paths; one or more flow sensor assemblies 10 being too far away from adjacent flow sensor assemblies 10 and therefore having difficulties transmitting data to the adjacent flow sensor assemblies 10; one or more of the flow sensor assemblies 10 stop working preventing the non-working flow sensor assembly 10 from transmitting its own collected data and re-transmitting data from adjacent flow sensor assemblies 10; etc. By having the central receiving unit 50 determine a transmission quality indicator for each flow sensor assembly 10 in the flow sensor system 200, an operator can see which flow sensor assemblies 10 are more readily updating the information and know that in some cases the information shown for a particular flow sensor assembly 10 may be outdated or inaccurate because that flow sensor assembly 10 is not transmitting data at regular intervals.

If each flow sensor assembly 10 is configured to send a heartbeat signal if it has enough power to transmit wireless signals, but not enough power to detect the passage of the particulate material through the delivery tube 110 the flow sensor assembly 10 is monitoring, the central receiving unit 50 can receive these heartbeat signals. The central receiving unit 50 will then know that while the flow sensor assembly 10 is not transmitting data about the flow of particulate material in the delivery tube 110 it is monitoring, it is still technically functioning. The central receiving unit 50 can transmit this information to the display module 60 which can then display it to the operator of the tow vehicle 350 so that the operator of the tow vehicle 350 knows that while the flow sensor assembly 10 is arguably working, particulate material may stop flowing through the delivery tube 110 it is monitoring and the operator may not necessary be informed about it since the flow sensor assembly 10 may not get enough power to monitor it.

In order to install and configure the flow sensor system 200 on an air seeder 300, each flow sensor assembly 10 can be associated with one of the ground engaging tools 340 in the central receiving unit 50 (or the display module 60). In this manner, when the central receiving unit 50 (or the display module 60) receives a signal from one of the flow sensor assemblies 10, the information in the wireless signal can be matched up to the ground engaging tool 340 that uses the delivery tube 100 that the flow sensor assembly 10 is monitoring. This can allow the display module 60 to display to the operator not only when a delivery tube 110 is blocked but also provide an exact indicator of the ground engaging tool 340 it is provided on and a physical location of the ground engaging tool 340.

To configure the flow sensor system 200, a unique number assigned to each flow sensor assembly 10 can be entered to associate it with a particulate ground engaging tool 340. In some cases the ground engaging tools 340 could be identified based on a manufacturer's "shank number". This number for each flow sensor assembly 10 could be on a bar code that an installer will manually enter into the central receiving unit 50 or display module 60 or it could be a barcode that the installer could scan with a bar code reader or application in a mobile device, such as tablet, etc. In this manner, a unique identifier for each flow sensor assembly 10 can be entered into the system and associated with a specific ground engaging tool 340.

Figure 6:
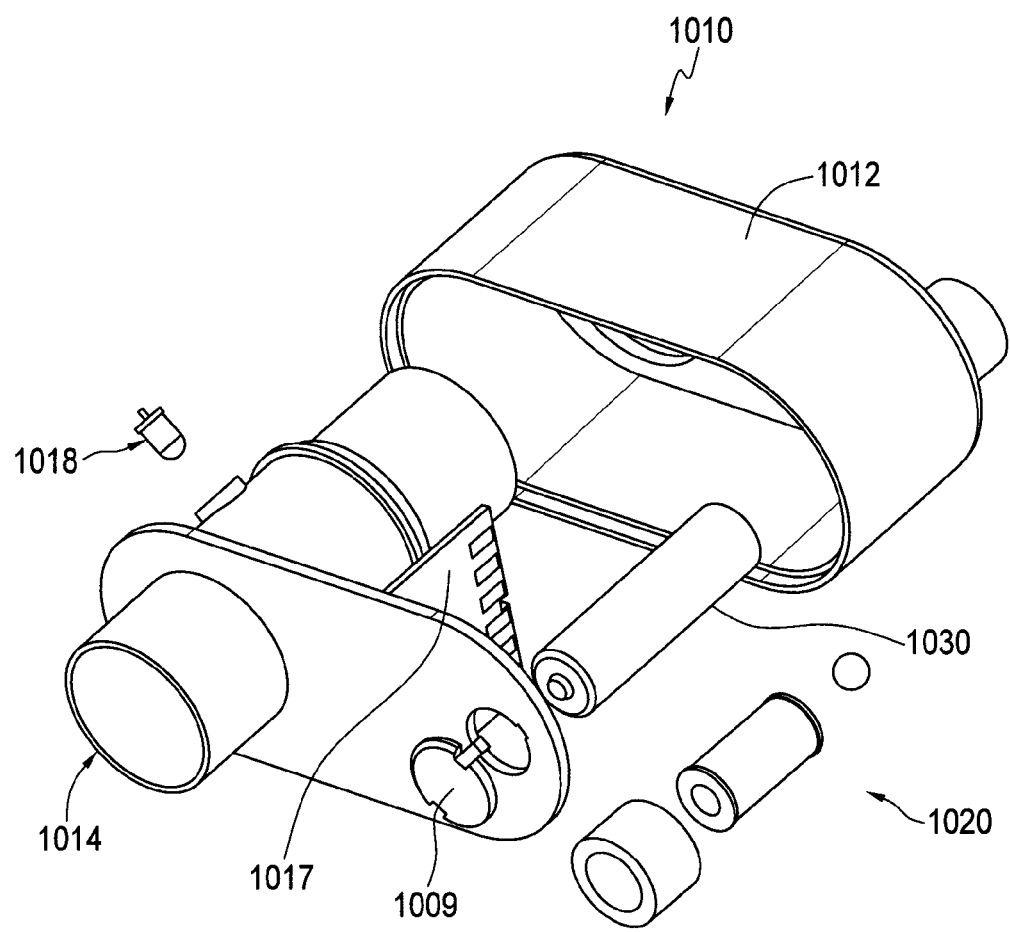
FIG. 6 is an exploded view of a flow sensor assembly in another aspect.

When the power supply being used to power a flow sensor assembly is a vibration powered electrical generator, it might be desirable to have a secondary battery supply that can be used to temporarily power the flow sensor assembly. This could allow the flow sensor assembly to be temporarily supplied with power when the air seeder apparatus the flow sensor assembly is attached to is in motion and causing the flow sensor assembly to vibrate. This temporary source of power could allow a person to configure and/or test the flow sensor assembly without having to have the air seeder apparatus it is attached to in motion. FIG. 6 illustrates a flow sensor assembly 1010 that includes a battery 1030, in addition to a primary power source 1020 that generates power from vibrations. The flow sensor assembly 1010 can contain many components that are similar to the components in the flow sensor assembly 10 shown in FIG. 1 and like flow sensor assembly 10, flow sensor assembly 1010 can be used to sense the passing of an agricultural product such as seed, fertilizer or other particulate material through a delivery tube on an air seeder (not shown). Like the flow sensor assembly 10, the flow sensor assembly 1010 can include a housing 1012, a passage 1014, a processing unit 1017, a radio node (not shown) and a particulate material sensor 1018.

In addition to a primary power source 1020, the flow sensor assembly 1010 can include a battery 1030 that can temporarily supply power to the flow sensor assembly 1010 when an air seeder apparatus the flow sensor assembly 1010 is attached to is not being moved and therefore not causing the flow sensor assembly 1010 to vibrate and the primary power source 1020 to generate electrical energy. A battery cover 1009 can be used to allow a person to install or replace the battery 1030 in the flow sensor assembly 1010.

With the wireless power source 1020 being a vibration powered electrical generator, the primary power source 1020 can be used to power the flow sensor assembly 1010 when the flow sensor assembly 1010 is being used on an air seeder apparatus to monitor the flow of agricultural product. During normal operation of the air seeder apparatus, the flow sensor assembly 1010 will be subjected to a lot of motion. Not only will the flow sensor assembly 1010 be moving with the entire air seeder apparatus, but the furrow opener the flow sensor assembly 1010 will typically be attached to will also move a lot because it is being pulled through the ground to create a furrow. This will typically provide a lot of motion of the flow sensor assembly 1010 that should allow the primary power source 1020 to generate the necessary electrical energy to power the flow sensor assembly 1010. However, in some cases it may be desirable to have power temporarily supplied to the flow sensor assembly 1010 when the air seeder apparatus is not in use and the flow sensor assembly 1010 is not being subjected to relatively constant vibrations that would allow the primary power source 1020 to generate electrical energy.

In some circumstances it may be desirable to configure and/or test one or more flow sensor assemblies 1010 in a flow sensor system installed on an air seeder apparatus without having to move the entire air seeder apparatus around. In these cases, the air seeder apparatus would typically not be moving, but instead simply sitting in place while an operator goes about testing and configuring the different flow sensor assemblies 1010. Because the air seeder apparatus is not moving, the flow sensor assemblies 1010 will typically not be subjected to significant or repeated vibrations which would in turn prevent the primary power source 1020, which uses vibrations to generate electrical power, from supplying the flow sensor assembly 1010 with the necessary power to allow the flow sensor assembly 1010 to operate. The battery 1030 can be used to temporarily supply power to the flow sensor assembly 1010 for a set period of time in order to allow the flow sensor assembly 1010 to operate for the set period of time; allowing a person time to configure and/or test the flow sensor assembly 1010 without needing to move the entire air seeder apparatus.

The set period of time could be any period of time that is deemed necessary to allow configuration or testing of the flow sensor assembly 1010 and could range from a few minutes up to several hours.

The flow sensor assembly 1010 can be equipped with a simple button that a person can use to have the flow sensor assembly 1010 operate using power supplied by the battery 1030. However, in another aspect, having a person move or shake the flow sensor assembly 1010, such as moving or shaking the furrow opener the flow sensor assembly 1010 is connected to, can cause the flow sensor assembly 1010 to user power supplied by the battery 130 for the set period of time.

In one aspect, the flow sensor assembly 1010 can be simply powered by battery 1030 for the set period of time after they are first moved. In this manner, if a person has moved them to start the set period of time, the flow sensor assembly 1010 will simply be supplied with power for the set period of time. However, if the flow sensor assembly 1010 is being used to monitor flow while an air seeder apparatus it is attached is operating, the first movement of the air seeder apparatus will cause the battery 1030 to supply power to the flow sensor assembly 1010 for the set period of time. After the set period of time, the continual movement of the flow sensor assembly 1010 as the air seeder apparatus is in motion will cause the primary power supply 1020 to supply power to the flow sensor assembly 1010. Alternatively, the flow sensor assembly 1010 could selectively obtain its power from the primary power supply 1020 instead of the battery 1030 if the flow sensor assembly 1010 continues to be subjected to regular vibrations.

In another aspect, a central receiver receiving data from a number of flow sensor assemblies 1010 in a flow sensor system installed on an air seeder apparatus could transmit a signal to the flow sensor assemblies 1010 to obtain power from the primary power supplies 1020, rather than the batteries 1030, when the air seeder apparatus is going to be used. This could indicate to the various flow sensor assemblies 1010 that the flow sensor assemblies 1010 will be subjected to relatively constant vibrations and not simply being triggered by a person to test or configure. This could allow the flow sensor assembly 1010 to conserve the battery 1030 when the set period of time is quite long and the flow sensor assembly 1010 is going to be subjected to constant vibrations during operation of the air seeder apparatus.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. An agricultural product flow sensor system for delivery tubes in an air seeder, the system comprising:
    a plurality of flow sensor assemblies, each flow sensor assembly comprising:
        a particulate material sensor operative to sense agricultural product passing through an attached delivery tube;
        a radio node comprising a wireless signal receiver operative to receive wireless signals and a wireless signal transmitter operative to transmit wireless signals;
        a processing unit, the processing unit operative to: receive and store data from the particulate material sensor; control the radio node to receive wireless signals from other flow sensor assemblies; and control the radio node to transmit wireless signals containing information obtained from the particulate material sensor; and
        a wireless power source operative to supply power to the particulate material sensor, the radio node and the processing unit,
        wherein the flow sensor assembly is operative to determine a flow indicator indicating whether particulate material is flowing through the attached delivery tube and transmit this flow indicator in a wireless flow signal, and
    a central receiving unit operative to receive wireless flow signals, and operative to transmit information to a display module in a tractor towing the air seeder,
    wherein each flow sensor assembly is operative to receive a wireless flow signal from neighboring flow sensor assemblies and retransmit the wireless flow signal.

2. The system of claim 1 wherein the plurality of flow sensor assemblies transmit wireless signals to the central receiving unit using a mesh network protocol.

3. The system of claim 1 wherein at least one of the plurality of flow sensor assemblies is operative to transmit a wireless flow signal a distance that is less than a distance between the at least one of the plurality of flow sensor assemblies and the central receiving unit.

4. The system of claim 1 wherein the wireless flow signal contains a flow rate of agricultural product through the delivery tube.

5. The system of claim 1 wherein the power source is a vibration-powered electrical generator.

6. The system of claim 5 wherein the vibration powered electrical generator comprises: a magnet; a coil; and steel ball.

7. The system of claim 1 wherein the particulate material sensor is one of: an optical sensor; and an ultrasonic sensor.

8. The system of claim 1 wherein the radio node of at least one of the flow sensor assemblies has a transmission range that is less than a distance to the central receiving unit.

9. The system of claim 1 wherein the central receiving unit determines a transmission quality indicator for at least one of the plurality of flow sensor assemblies and transmit the transmission quality indicator to the display module for display, the transmission quality indicator based on how frequently the central receiving unit is receiving wireless flow signals from the at least one of the plurality of flow sensor assemblies.

10. The system of claim 1 wherein each flow sensor assembly operates in two discrete states: a first state wherein the particulate material sensor is used to sense agricultural product passing through the attached delivery tube; and a second state wherein the radio node is used to transmit a wireless flow signal.

11. The system of claim 6 wherein at least one of the flow sensor assemblies further comprises a battery and wherein the battery is operative to power the at least one flow sensor assembly for a set period of time.

12. An air seeder for placing agricultural product in the ground, the air seeder comprising:
a frame supported by at least one drive wheel;
a plurality of ground engaging members connected to the frame, each ground engaging member having a furrow opener for forming a furrow in the ground;
a plurality of supply tubes, each supply tube running to one of the plurality of ground engaging members to deposit agricultural product that has passed through the supply tube into a furrow created by the ground engaging tool;
a plurality of flow sensor assemblies, each flow sensor assembly attached to a supply tube on one of the ground engaging members, each flow sensor assembly operative to determine a flow indicator indicating whether particulate material is flowing through the attached delivery tube and transmit this flow indicator in a wireless flow signal, each flow sensor assembly operative to receive a wireless flow signal from neighboring flow sensor assemblies and retransmit the wireless flow signal; and
a central receiving unit operative to receive wire flow signals, and operative to transmit information to a display module in a tractor towing the air seeder.

13. The air seeder of claim 12 wherein the plurality of flow sensor assemblies transmit wireless signals to the central receiving unit using a mesh network protocol.

14. The air seeder of claim 12 wherein the central receiving unit transmit information to the display module using one of: wirelessly; and wired.

15. The air seeder of claim 12 wherein at least one of the plurality of flow sensor assemblies is operative to transmit a wireless flow signal a distance that is less than the distance between the at least one of the plurality of flow sensor assemblies and the central receiving unit.

16. The air seeder of claim 12 wherein the wireless flow signal contains a flow rate of agricultural product through the delivery tube.

17. The air seeder of claim 12 wherein the power source is a vibration-powered electrical generator.

18. The air seeder of claim 17 wherein the vibration-powered electrical generator comprises: a magnet; a coil; and steel ball.

19. The air seeder of claim 11 wherein the particulate material sensor is one of: an optical sensor; an ultrasonic sensor; and a microwave sensor.

20. The air seeder of claim 12 wherein at least one of the flow sensor assemblies has a radio node with a transmission range that is less than a distance to the central receiving unit.

21. The air seeder of claim 12 wherein the central receiving unit determines a transmission quality indicator for at least one of the plurality of flow sensor assemblies and transmits the transmission quality indicator to the display module for display, the transmission quality indicator based on how frequently the central receiving unit is receiving wireless flow signals from the at least one of the plurality of flow sensor assemblies.

22. The air seeder of claim 11 wherein each flow sensor assembly operates in two discrete states: a first state wherein the particulate material sensor is used to sense agricultural product pasing through the attached delivery tube; and a second state wherein the radio node is used to transmit a wireless flow signal.

23. The system of claim 17 wherein at least one of the flow sensor assemblies further comprises a battery and wherein the battery is operative to power the at least one flow sensor assembly for a set period of time.

24. A flow sensor assembly for sensing the passing of an agricultural product, the flow sensor comprising:
a particulate material sensor operative to sense agricultural product passing through an attached delivery tube;
a radio node comprising a wireless signal receiver operative to receive wireless signals, and a wireless signal transmitter operative to transmit wireless signals;
a processing unit, the processing unit operative to: receive and store data from the particulate material sensor; control the radio node to receive wireless signals from other flow sensor assemblies; and control the radio node to transmit wireless signals containing information obtained from the particulate material sensor; and
a wireless power source operative to supply power to the particulate material sensor, the radio node and the processing unit.

25. The flow sensor assembly of claim 24 wherein the flow sensor assembly is operative to receive a wireless flow signal from neighboring flow sensor assemblies and retransmit the wireless flow signal.

26. The flow sensor assembly of claim 24 wherein the flow sensor assembly operates using a mesh network protocol.

27. The flow sensor assembly of claim 24 wherein the power source is a vibration-powered electrical generator.

28. The flow sensor assembly of claim 27 wherein the vibration powered electrical generator comprises: a magnet; a coil; and steel ball.

29. The flow sensor assembly of claim 24 wherein the particulate material sensor is one of: an optical sensor; and an ultrasonic sensor.

30. The flow sensor assembly of claim 24 wherein the flow sensor assembly operates in two discrete states: a first state wherein the particulate material sensor is used to sense agricultural product passing through the attached delivery tube; and a second state wherein the radio node is used to transmit a wireless flow signal.

31. The flow sensor assembly of claim 27 further comprising a battery and wherein the battery is operative to power the flow sensor assembly for a set period of time.

* * * * *